United States Patent [19]
Sato

[11] Patent Number: 5,453,758
[45] Date of Patent: Sep. 26, 1995

[54] INPUT APPARATUS

[75] Inventor: Kazuhiro Sato, Tokyo, Japan

[73] Assignee: Sony Corporation, Tokyo, Japan

[21] Appl. No.: 98,896

[22] Filed: Jul. 29, 1993

[30] Foreign Application Priority Data

Jul. 31, 1992 [JP] Japan ..................... 4-223569
May 21, 1993 [JP] Japan ..................... 5-141248

[51] Int. Cl.$^6$ ................................. G08C 19/06
[52] U.S. Cl. ........................ 345/158; 345/156
[58] Field of Search ..................... 345/157, 156, 345/164, 158; 73/514, 497; 364/453; 341/20, 21

[56] References Cited

U.S. PATENT DOCUMENTS

| | | | |
|---|---|---|---|
| 3,782,205 | 1/1974 | Fletcher et al. | 73/497 |
| 4,580,006 | 4/1986 | Hull | 345/157 |
| 4,601,206 | 7/1986 | Watson | 73/514 |
| 4,831,544 | 5/1989 | Hojo et al. | 364/453 |
| 4,839,838 | 6/1989 | La Biche et al. | 345/157 |
| 5,012,231 | 4/1991 | Felsenstein | 345/161 |
| 5,288,078 | 2/1994 | Capper et al. | 345/156 |
| 5,296,871 | 3/1994 | Paley | 345/156 |
| 5,329,276 | 7/1994 | Hirabayashi | 345/157 |

*Primary Examiner*—Richard Hjerpe
*Assistant Examiner*—Steven J. Saras
*Attorney, Agent, or Firm*—Ronald P. Kananen

[57] ABSTRACT

An input apparatus comprising one or more detectors for detecting a physical displacement of a given movement in space, an information generating device for generating position specifying information based on a detection result outputted from the detectors, and a transmitter for transmitting the position specifying information generated by the information generating device to predetermined equipment as input information. The input apparatus according to the invention outputs as operator information the position specifying information obtained by detecting input apparatus's physical displacement, movement velocity, or acceleration to generate a predetermined command signal corresponding to movements of a human being for example, thereby providing the input apparatus excellent in both operator efficiency and human interface.

5 Claims, 15 Drawing Sheets

FIG. 12(a)
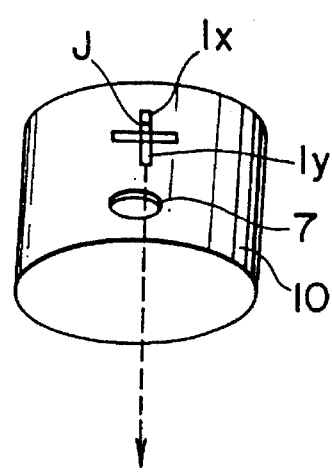
GRAVITY
FIG. 12(b)
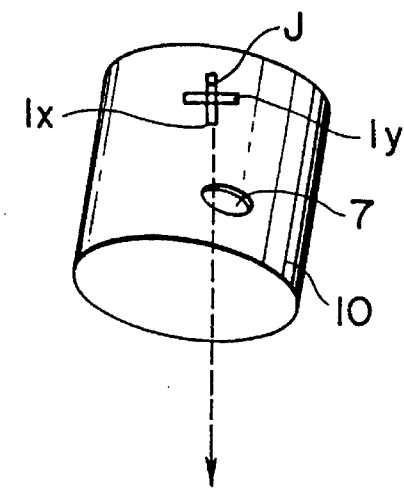
GRAVITY
FIG. 13
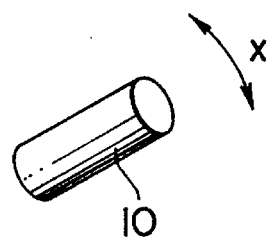
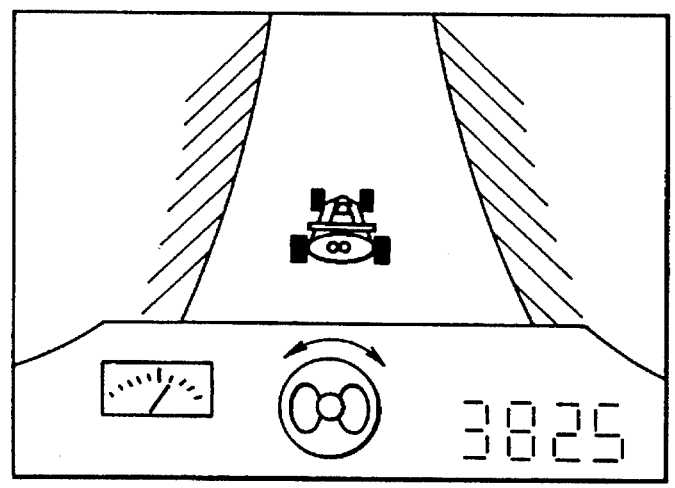

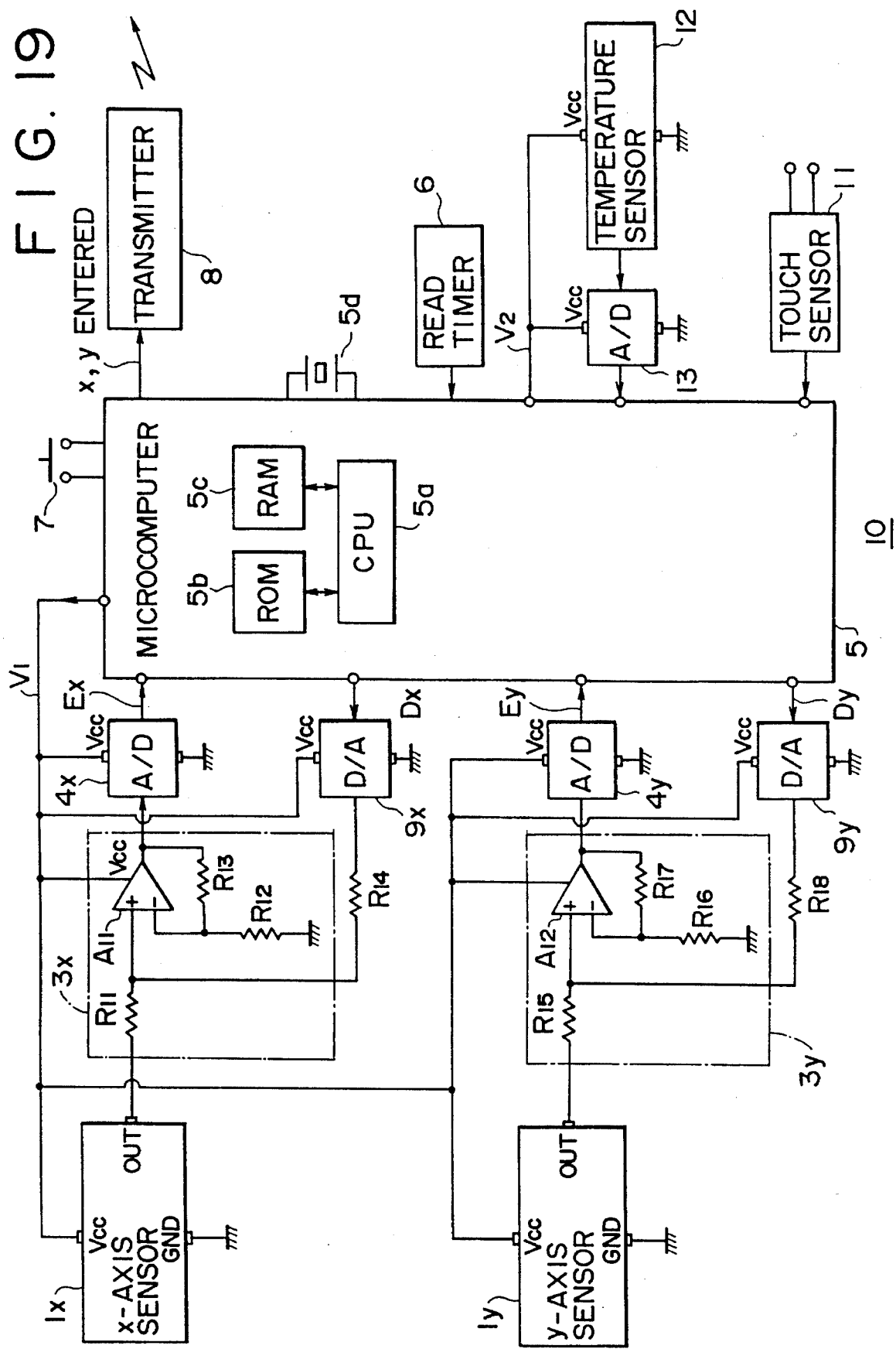

F I G. 20(a)

F I G. 20(b)

INPUT APPARATUS

BACKGROUND OF THE INVENTION

1. Field of the Invention

The present invention relates to an input apparatus for entering operator information and the like into predetermined equipment.

2. Description of the Prior Art

Widely known as apparatus for entering operator information and the like into predetermined equipment are a remote commander for use with audio/visual equipment, a mouse for use with computers, and an operator control for use with game playing apparatus. The conventional input apparatus, however, are not always suitable for a human being to operate in terms of human interface.

It is also pointed out that, as equipment require their operators to perform more diversified operations, an operation of an input apparatus for such equipment becomes more complicated, making it more difficult to operate the equipment by means of the input apparatus. For example, the remote commander for use with audio/visual equipment is provided with more keys to operate as the equipment becomes more functionally sophisticated, confounding operators of the remote commander. As for the mouse for use with a computer, a certain amount of desktop space for example is always required for moving the mouse around to enter positional information into the computer, making it inconvenient to operate the mouse in a tight space.

OBJECTS AND SUMMARY OF THE INVENTION:

It is therefore an object of the present invention to provide an input apparatus which provides an excellent man-machine interface by generating a predetermined input signal in correspondence with human motions.

In carrying out the invention and according to one aspect thereof, there is provided an input apparatus comprising detecting means for detecting a physical displacement of a movement in space, information generating means for generating position specifying information based on the physical displacement information outputted from the detecting means, and sending means for sending the position specifying information outputted from the information generating means to predetermined equipment as input information. When the detecting means also provides means for detecting a velocity of a given travel in space, the information generating means generates the position specifying information based on the travelling velocity outputted from the detecting means. The detecting means further provides means for detecting an acceleration of a given travel in space and the information generating means generates the position specifying information based on the acceleration outputted from the detecting means. In these situations, the detecting means is provided in plurality and the information generating means generates, based on the outputs from the detecting means, the position specifying information in multidimensional coordinates corresponding to a given travel in space. Additionally, the detecting means is held in a floating state inside the input apparatus to always keep itself in a constant positional state relative to gravity direction regardless of an angle at which the input apparatus is held.

Thus, the position specifying information obtained by detecting the physical displacement, travelling velocity, or the acceleration of the input apparatus as mentioned above allows a motion itself of an operator relative to the input apparatus to be an input operation for the predetermined equipment. To be specific, when the input apparatus held in the operator's hand is moved horizontally or vertically or rotated for example, such a motion itself provides a predetermined operation which instructs the predetermined equipment to perform a corresponding predetermined operation. Further, angles at which the input apparatus is held in the operator's hand do not affect the position specifying information to be output because the floating detecting means is always held in a constant orientation relative to the gravity direction, reflecting the operator's hand motions.

BRIEF DESCRIPTION OF THE DRAWINGS

Other objects, advantages, and capabilities of the present invention will become more apparent as the description proceeds, together with the accompanying drawings, in which:

FIG. 12 comprising FIG. 12(a) and FIG. 12(b) is a diagram illustrating how the detecting means in the embodiment of FIG. 1 is held in a constant direction relative to gravity direction;

FIG. 13 is a diagram illustrating an input apparatus of the embodiment of FIG. 1 used as operating means for a game machine;

FIG. 19 is a block diagram illustrating a constitution of an input apparatus of the embodiment of FIG. 18;

FIG. 20 comprising FIG. 20(a) and FIG. 20(b) is a diagram illustrating a motion detecting signal obtained when the input apparatus of the embodiment of FIG. 1 is in a resting state.

DESCRIPTION OF THE PREFERRED EMBODIMENTS

First, a basic constitution of a remote commander using an angular velocity sensor practiced as one embodiment of the input apparatus according to the present invention will be described with reference to FIGS. 1 through 7.

Figure 1:
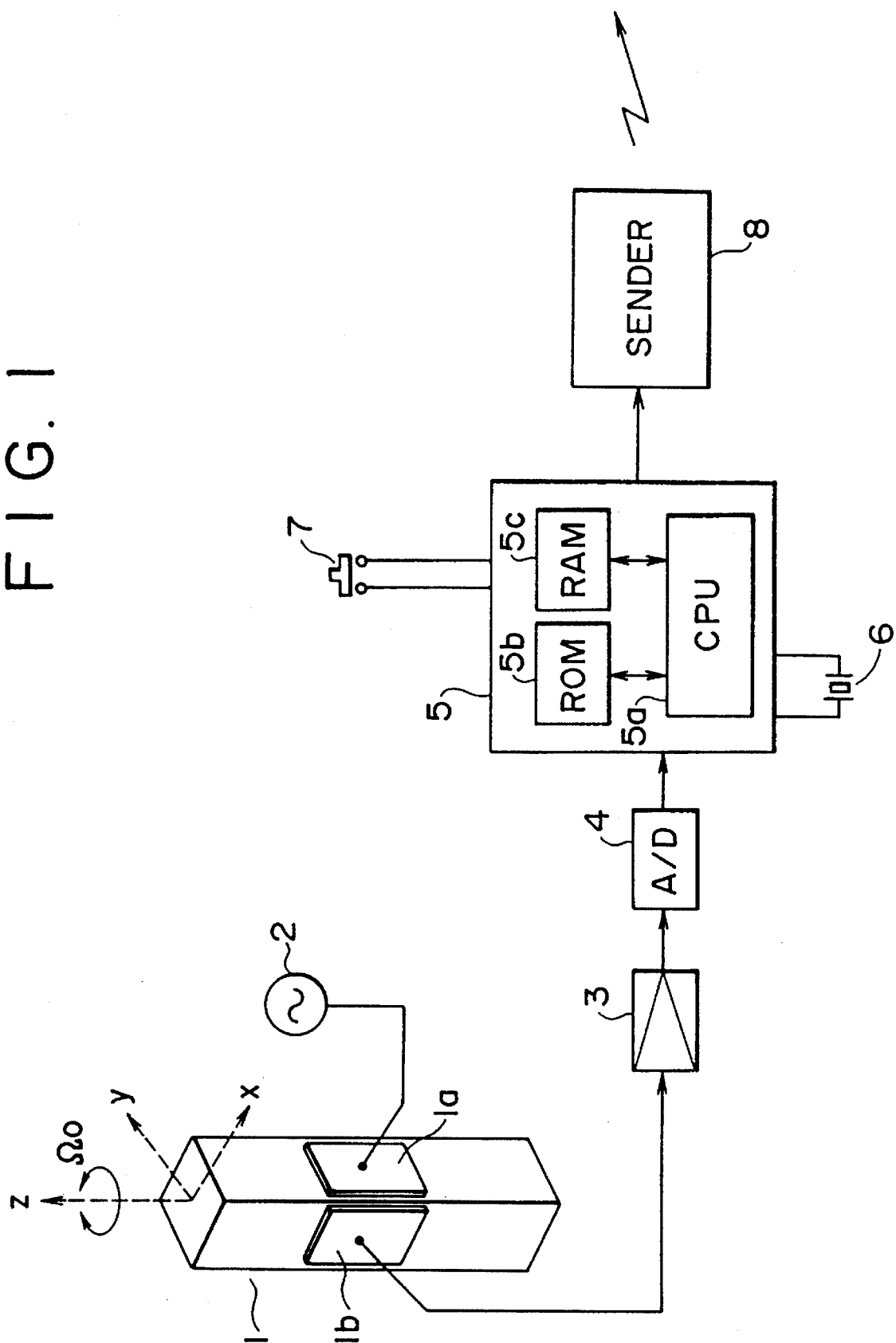
FIG. 1 is a block diagram illustrating an embodiment using an angular velocity sensor according to the invention.

FIG. 1 illustrates an internal constitution of the remote commander. Reference numeral 1 indicates an oscillation gyroscope used as the angular velocity sensor. The oscillation gyroscope is characterized in that applying a rotational angular velocity to an oscillating object generates a Coriolis force F, which is expressed as follows:

$$F = 2mv\omega$$

where m=mass, v=velocity, $\omega$=angular velocity. Thus, the angular velocity $\omega$ is proportional to the Coriolis force F, allowing detection of a rotational angular velocity by detecting the Coriolis force F.

An oscillation gyroscope 1 is provided with driving piezoelectric ceramics 1a and detecting piezoelectric ceramics 1b. The driving piezoelectric ceramics 1a is applied with an alternating signal, which is an output of an oscillator 2. When the oscillation gyroscope 1 is rotated in a direction of –0 with the alternating signal applied to driving piezoelectric ceramics 1a, a Coriolis force F is applied to the detecting piezoelectric ceramics 1b, generating a voltage E. The minute voltage generated by the detecting piezoelectric ceramics 1b is amplified by an amplifier 3 to be converted by an analog-digital (A-D) converter 4 into a digital signal.

Figure 4:
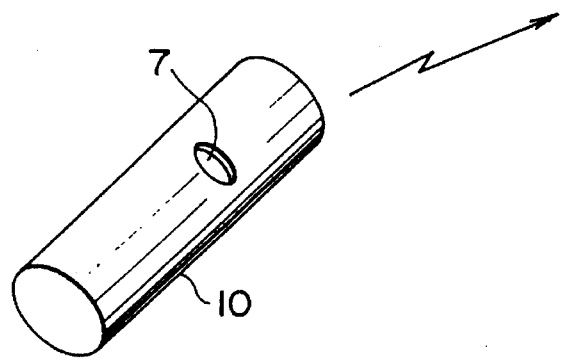
FIG. 4 is a diagram illustrating an external view of a remote commander of the embodiment.

Reference numeral 5 indicates a controller comprising a CPU 5a, ROM 5b, and RAM 5c. The ROM 5b and the RAM 5c store command signals to be transmitted, respectively. Reference numeral 6 indicates a clock oscillator. Reference numeral 7 indicates an Enter key provided as an operator key on a remote commander 10 for example as shown in FIG. 4. Information generated by operating the Enter key 7 is also fed to the controller 5. The controller 5, in response to an operation of the Enter key 7, reads an Enter command from the ROM 5b or RAM 5c and supplies it to a transmitter 8.

Figure 2:
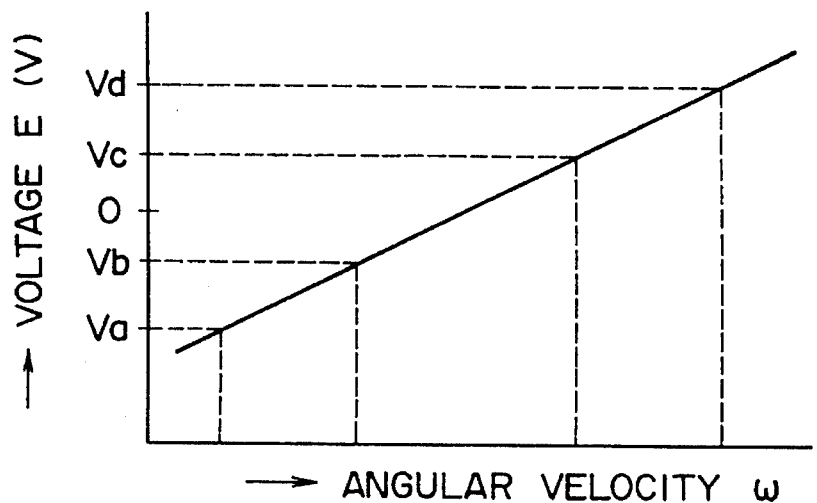
FIG. 2 is a diagram illustration a relationship between an angular velocity and a voltage output in the angular velocity sensor the of embodiment.

Also, the controller 5 reads an Up command or a Down command from from the ROM 5b or RAM 5c depending on the digital data of voltage E coming from the A-D converter 4 and supplies the command to the transmitter 8. The angular velocity $\omega$ applied to the oscillation gyroscope 1 and the generated voltage E are in a proportional relationship as shown in FIG. 2. Consequently, the controller 5 compares the input voltage E (digital data) with voltage values Va, Vb, Vc, and Vd for example, allowing an output of a command code which corresponds to an operation performed on the remote commander 10 by the operator.

Figure 3:
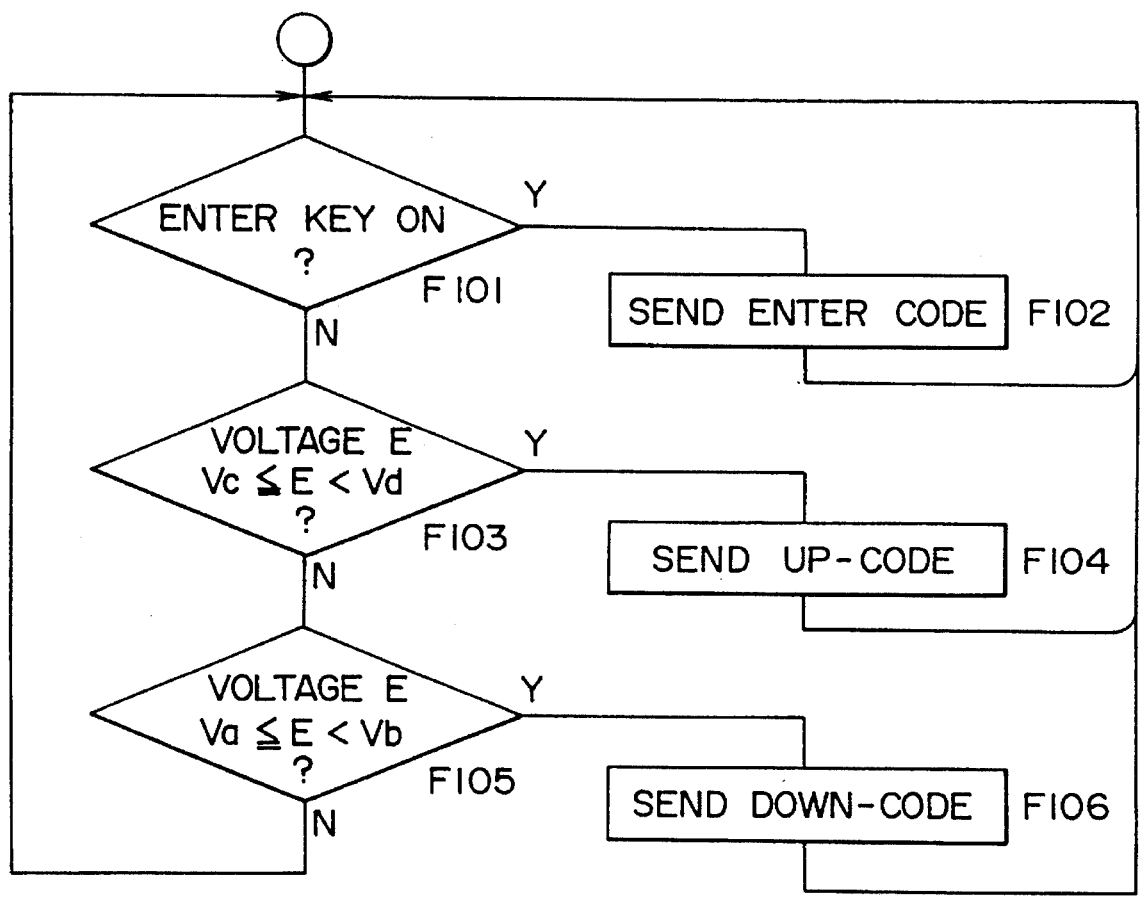
FIG. 3 is a flowchart illustrating a command code deciding operation based on a detected angular velocity of the embodiment.

To be more specific, if the oscillation gyroscope 1 is disposed in a remote commander 10 (FIGS. 4, 5, and 7) so that the voltage E rises by an angular velocity caused by swaying up the remote commander 10 and the voltage E falls by an angular velocity caused by swaying down the remote commander 10, the controller 5 determines a command code to be generated following a sequence illustrated by the flowchart of FIG. 3.

When the Enter key 7 is pressed, an Enter command is generated unconditionally (F101, F102 of FIG. 3); in other cases, the entered voltage E (digital data) is compared with the voltage values Va, Vb, Vc, and Vd. If Vc<E<Vd, that is, if the remote commander 10 has been swayed up, the controller 5 reads the UP command from the ROM 5b or the RAM 5c (F103, F104 of FIG. 3). If Va<E<Vb, that is, if the remote commander 10 has been swayed down, the controller 5 reads the Down command (F105, F106 of FIG. 3).

Thus, the command code generated by the controller 5 is modulated by the transmitter 8 in a predetermined manner to be sent to the predetermined equipment as an infrared-ray signal or a radio signal.

It should be noted here that, if the voltage E entered in the controller 5 is in a relation of Vb$\leq$E $\leq$Vc, the controller 5 generates no command code. This is because this relation is set as a dead zone in which no command code is output when the operator touches the remote commander 10 or carries it.

Figure 5:
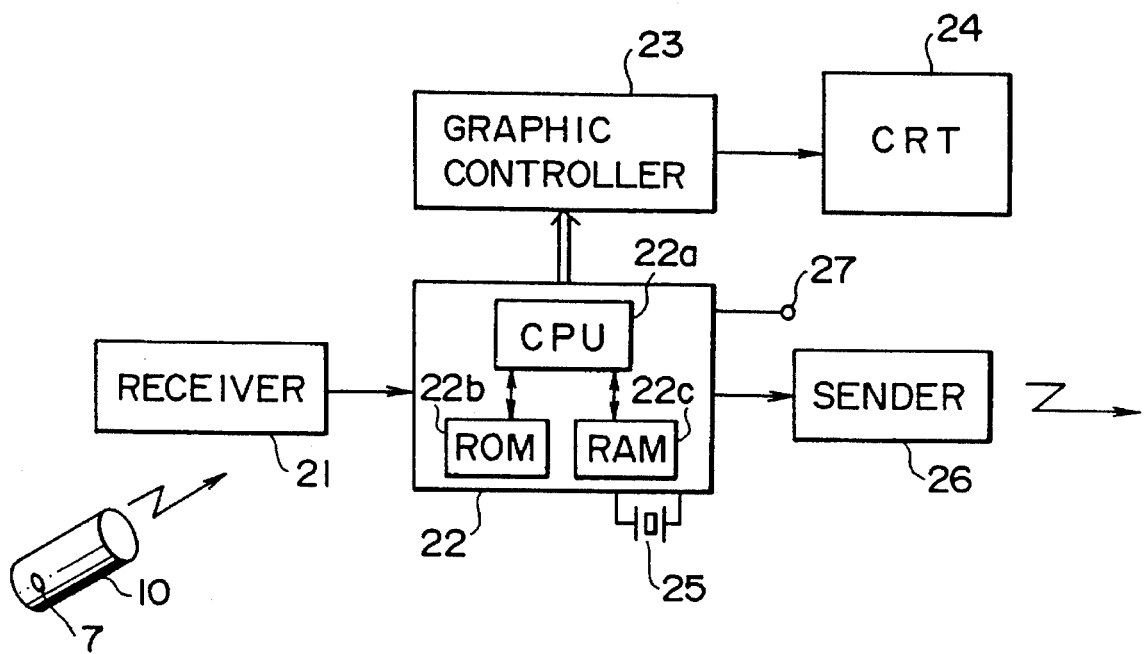
FIG. 5 is a block diagram illustrating a controller for controlling input commands corresponding to motions of the remote commander of the embodiment.

Although the remote commander 10 outputs only three types of command codes, the Enter command, the Up command, and the Down command, providing an input command controller having a constitution as shown in FIG. 5 for example on a receiver side integrally with or separate from the target equipment allows many more operations than these three.

Referring to FIG. 5, reference numeral 21 indicates a receiver for receiving a command code coming from the remote commander 10 as an infrared-ray or radio signal to convert it into an electrical signal for demodulation. Reference numeral 22 indicates a microcomputer-based input controller to perform control based on the command code demodulated by the receiver 21. This controller has a CPU 22a, a ROM 22b, and a RAM 22c. Reference numeral 23 indicates a graphic controller which, under control of the controller 22, supplies predetermined characters to a display device (a CRT for example) integrally formed or separately connected with the target equipment. Reference numeral 25 is a clock oscillator.

Figure 6:
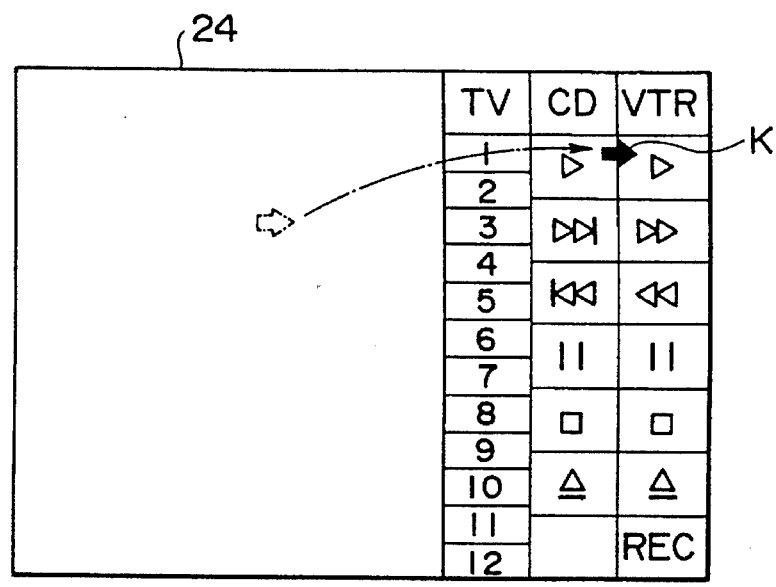
FIG. 6 is a diagram for describing an example of display of contents of an operation by the controller of FIG. 5.

The input controller 22 makes the graphic controller 23 display contents of operations corresponding to a VTR, a CD player, and a television, as well as a cursor K as shown in FIG. 6 on a CRT 24. Then, the input controller 22, based on the Up command or the Down command supplied from the remote commander 10, moves the cursor K on the CRT.

If the operator presses the Enter key 7 after moving the cursor K to a location equivalent to a playback button of the VTR shown for example by swaying the remote commander 10, the input controller reads a command code for "VTR playback" from the ROM 22b or the RAM 22c to supply it to the transmitter 26, from which the command code is sent to a VTR equipment, not shown, as a modulated signal in the form of an infrared signal for example. Alternatively, if the input command controller of FIG. 5 is provided on the VTR equipment, not shown, the input controller 22 supplies the command code for "VTR playback" from a terminal 27 to a predetermined operation controller to make it execute a playback operation.

To be specific, the input controller 22 holds coordinate data corresponding to a display area for the operational contents on a display screen of the CRT 24 and stores actual command codes, thereby remembering a coordinate position currently pointed at by the cursor K when it has been moved to the position by position specifying information of the Up or Down command. When the Enter command is entered, the input controller 22 judges that a specification at that coordinate position has been determined and reads a command code stored as one corresponding to the coordinate position to send it to the transmitter 26 or the terminal 27.

Consequently, the operator sways up and down the remote commander while looking at the CRT 24 to move the cursor K to a predetermined location and presses the Enter key 7 to operate the target equipment. Thus, a key operation on the remote commander 10 becomes extremely simple. Also, because the cursor K moves in synchronization with a movement of the operator's hand holding the remote commander, human interface is remarkably enhanced. It will be apparent that the number of operator keys may be a minimum, completely solving a problem of operator confusion otherwise caused by a multitude of keys. Additionally, the operation while visually confirming its result on the CRT reduces operator load.

It should be noted that, with a remote control system such as the one mentioned above, it is not always necessary to install the Enter key 7 on the remote commander 10. Because the controller 22 on the receiving side knows the motion of the cursor K in the coordinate data, it is possible for the controller 22 to determine an Enter operation when the operator has moved the cursor K up and down several times over the display portion of operation "VTR playback" for example. When constituted as such, the remote commander 10 requires no key operation.

It will be apparent that an output sensitivity of the UP and Down commands may be variable to offset a difference in remote commander swaying force between different operators. To be specific, the amplifier 3 of the remote commander 10 may be provided with a control for adjustment or a coefficient of coordinate movement may be varied for the Up and Down commands used as coordinate movement information in the controller 22 on the receiving side.

It will also be apparent that, in the remote commander 10, the digital data obtained by A-D converting the voltage obtained from the oscillation gyroscope 1 may be sent from the transmitter 8 without change. In this case, the receiving side is constituted so that an integral value of the received voltage value data is used as a variation to move the cursor on the CRT.

Figure 7:
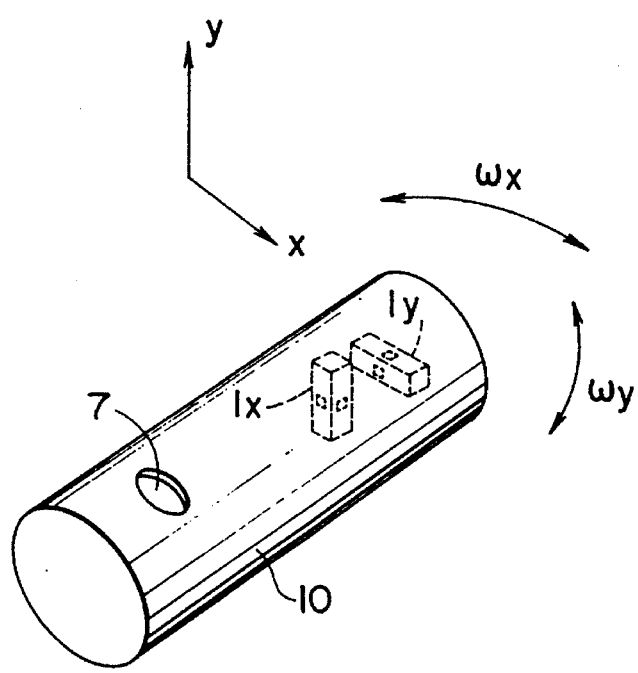
FIG. 7 is a diagram illustrating a disposition of the angular velocity sensor of the embodiment.

Described above is the basic constitution of the input apparatus that uses the oscillation gyroscope as the angular velocity sensor. In another approach, as shown in FIG. 7 for example, the oscillation gyroscope 1 may be disposed in two units (1x, 1y) in the remote commander 10 orthogonally as movement information (angular velocity) detecting means for a vertical direction y and a horizontal direction x. That is, an angular velocity −x obtained by vertically swaying the remote commander 10 is detected to output the Up command or the Down command and an angular velocity −y obtained by horizontally swaying the remote commander 10 is detected to output a move-to-left command or a move-to-right command for example. If the controller 22 on the receiving side is constituted so that the abovementioned vertical and horizontal operations are handled as a vertical movement and a horizontal movement of a i.e., coordinate position to be specified (coordinates at which the cursor K is displayed) to perform these operations, operator efficiency will be enhanced still further.

It will be apparent that, if the Enter command, the Up command, and the Down command are enough as information to be entered in the target equipment or if these commands plus the move-to-left and move-to-right commands are enough for that purpose, the input command controller shown need not be provided. In this case, the command receiving equipment may use command codes coming from the remote commander 10 directly as equipment control codes. Such a setup allows the remote commander to be used as an input apparatus having a capability equivalent to a mouse for use on a personal computer. Moreover, the above-mentioned setup is advantageous over the mouse, which uses a roller operation as input information, in that movement information may be converted into input information for transmission without having to make the input apparatus touch a desk top or the like, requiring no such facilities.

Another embodiment of the input apparatus according to the present invention uses an acceleration sensor to generate position specifying information. A basic constitution of this embodiment as the input apparatus is generally the same as that of the embodiment of FIG. 1, with the angular velocity sensor replaced with the acceleration sensor.

Figure 8:
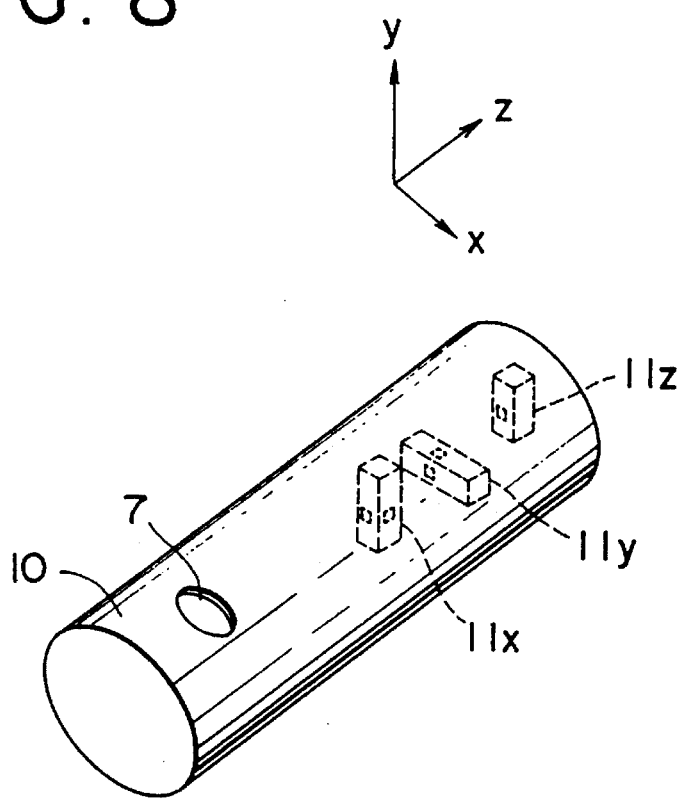
FIG. 8 is a diagram illustrating an embodiment using an acceleration sensor according to the invention.

Now, referring to FIG. 8, the acceleration sensor is installed in three units for example on the remote commander 10 functioning as the input apparatus; an acceleration sensor 11x disposed for detecting an acceleration of a horizontal (x direction) displacement action of the remote commander 10, an acceleration sensor 11y for detecting an acceleration of a vertical (y direction) displacement action, and an acceleration sensor 11z for detecting an acceleration of a displacement action in a direction (z direction) running generally at right angles to the x and y directions, or a back and forth direction. As a result, a predetermined command code is obtained in correspondence with a vertical, horizontal, or back and forth movement performed by the operator on the remote commander 10.

It will be apparent that the number of acceleration sensors may be set according to the target equipment; it may be one, two, or four.

Figure 9:
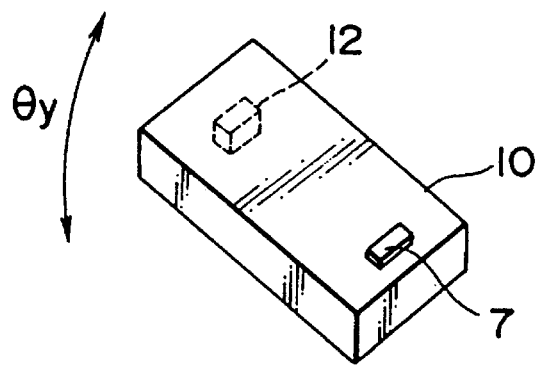
FIG. 9 is a diagram illustrating an embodiment using a tilt sensor according to the invention.

Also, a tilt sensor 12 may be used for physical displacement detecting means as shown in FIG. 9. In this case, a predetermined code is generated based on a tilt of the remote commander 10 in a vertical direction −y detected by the tilt sensor 12.

Figure 10:
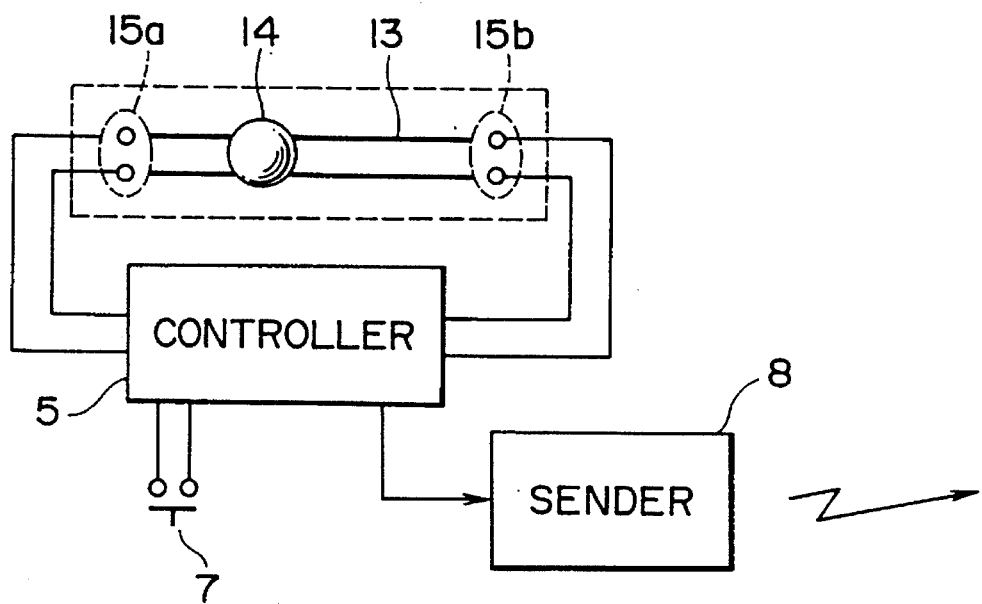
FIG. 10 is a diagram illustrating an embodiment using an angular displacement sensor based on a metal ball according to the invention.

Alternatively, a metal ball 14 rolling on a pair of rails 13 may be used for physical displacement detecting means as shown in FIG. 10. To be specific, when the input apparatus is tilted in a direction generally along the pair of rails 13, the metal ball 14 rolls to a terminal 15a or a terminal 15b to close its contact. A controller 5 identifies which terminal has been closed and generates a predetermined command signal accordingly. The generated signal is output via a transmitter 8.

Although the physical displacement, angular velocity, and acceleration of the input apparatus in a predetermined direction are detected by the abovementioned detecting means to generate position specifying information accordingly, it is rare for the operator to hold the input apparatus always in an exactly vertical or horizontal direction.

For example, as shown in FIG. 7, if the operator sways the input apparatus constituted to detect displacement information in x and y directions, horizontally with a tilt, x-direction displacement information and y-direction displacement information are synthesized to be detected. For example, if the input apparatus is operated with the command input controller shown in FIG. 5 provided, the cursor K moves on the screen diagonally. Thus, a correct correlation between an operator's hand movement and input information generated by the input apparatus held in the operator's hand is lost. It is therefore desirable that the detecting means be always held in a constant direction regardless of the tilt at which the input apparatus is operated.

Figure 11:
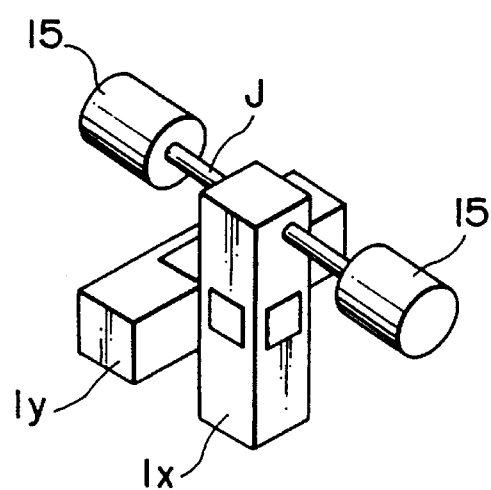
FIG. 11 is a diagram illustrating a floating structure of detecting means in the embodiment of FIG. 1.

To implement such a constitution, the detecting means (oscillation gyroscopes 1x, 1y) are fixedly secured on the input apparatus in an orthogonal manner as shown in FIG. 11. A journal J is passed through the oscillation gyroscope 1x disposed vertically for detecting a horizontal (x direction) angular velocity at an upper end to be held on bearings 15. That is, the detecting means are set, held in a floating state, inside the input apparatus. Resultantly, as shown in FIGS. 12(a) and (b) in which the input apparatus (the remote commander 10) is viewed perspectively downward, the detecting means (the oscillation gyroscopes 1x, 1y) disposed internally are always held in a constant direction relative to the direction of gravity regardless of tilting of the input apparatus. Thus, the correct output of operator information is secured regardless of how the operator holds the input apparatus.

It will be apparent that a detecting means floating structure is not restricted to the abovementioned bearing type.

The embodiments of the present invention find applications not only in a remote commander for electronic equipment such as AV equipment and air-conditioning equipment and an input apparatus equivalent to a mouse for personal computers but also in an operator control for use on game playing equipment. For example, as shown in FIG. 13, a car racing game is displayed with a car and a steering wheel which is operated by swaying the input apparatus containing the angular velocity sensor circularly in horizontal directions.

Figure 14:
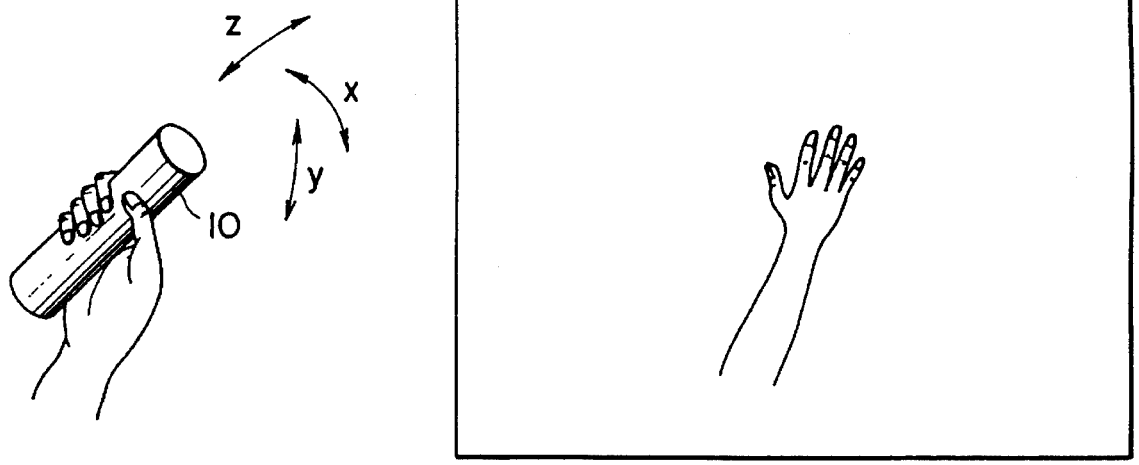
FIG. 14 is a diagram illustrating the input apparatus of the embodiment of FIG. 1 used as positional displacement information input means for a virtual reality system.
Figure 15:
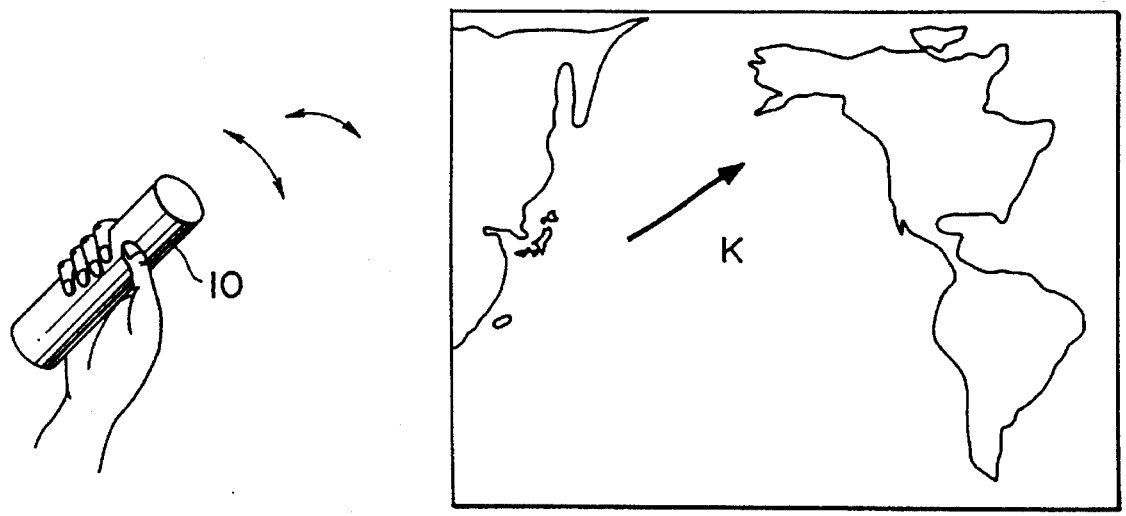
FIG. 15 is a diagram illustrating the input apparatus of the embodiment of FIG. 1 used as a pointing device.

Referring to FIG. 14, three acceleration sensors for generating three-dimensional displacement information in x, y, z directions are constituted as the input apparatus for use on so-called virtual reality equipment to convert motions of the operator hand holding the input apparatus into information of movements in x, y, z directions. Based on the input information, a simulation of a hand for example is displayed on the screen of the equipment.

Also, each embodiment is suitably used for a pointing device. For example, a conventional rod-antenna type pointer or a laser pointer is sometimes inconvenient in that the pointer may not reach a desired position, a presenter may intercept a presentation screen or the presenter may have a hard time to keep the pointer settled at a certain position while making a verbal description, by way of example. The present invention embodied as a pointing device can eliminate such inconveniences by moving the cursor K to a desired position on the screen as the pointer.

As apparent from the description above, the input apparatus according to the invention outputs as operator information the position specifying information obtained by detecting input apparatus's physical displacement, movement velocity, or acceleration to generate a predetermined command signal corresponding to movements of a human being for example, thereby providing the input apparatus excellent in both operator efficiency and human interface.

The embodiments according to the present invention also allow providing the position specifying information correctly reflecting the movements of the operator's hand holding the input apparatus regardless of how it is held in the operator's hand because the detecting means are held in the floating state inside the input apparatus to be always kept in a constant direction relative to the direction of gravity.

Now, it should be noted that the outputs of the above-mentioned sensors for detecting movements of the input apparatus are affected by a drift generally caused by a temperature variation or the like, making it difficult to use such sensors as accurate input operation detecting means.

Figure 16:
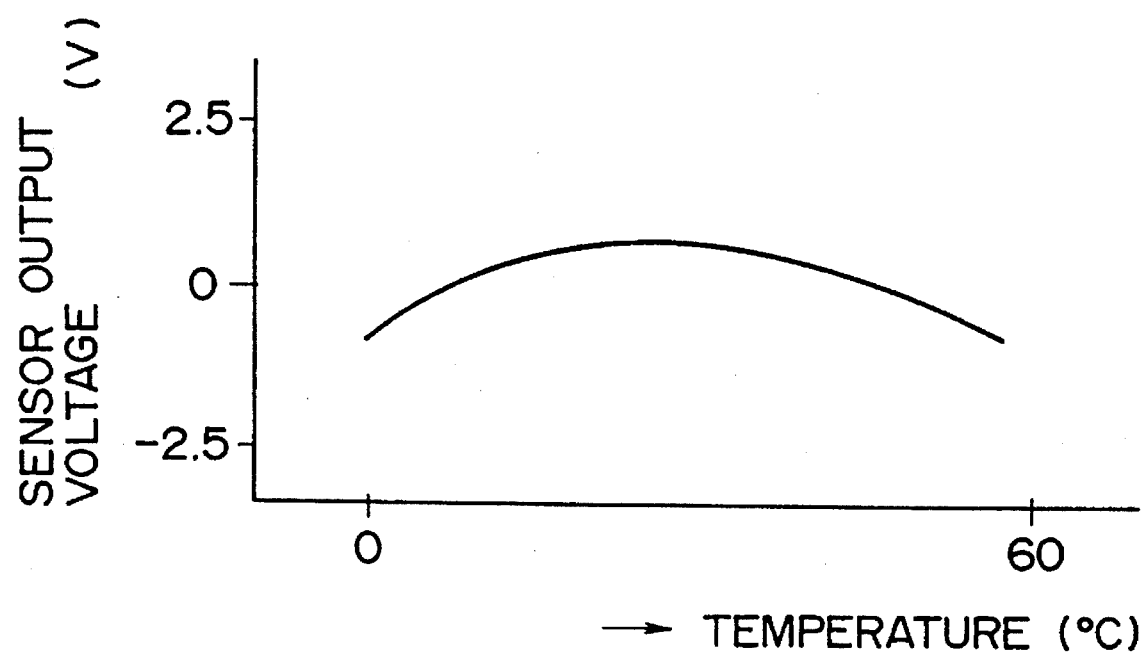
FIG. 16 is a diagram illustrating a drift characteristic of sensor output.
Figure 17:
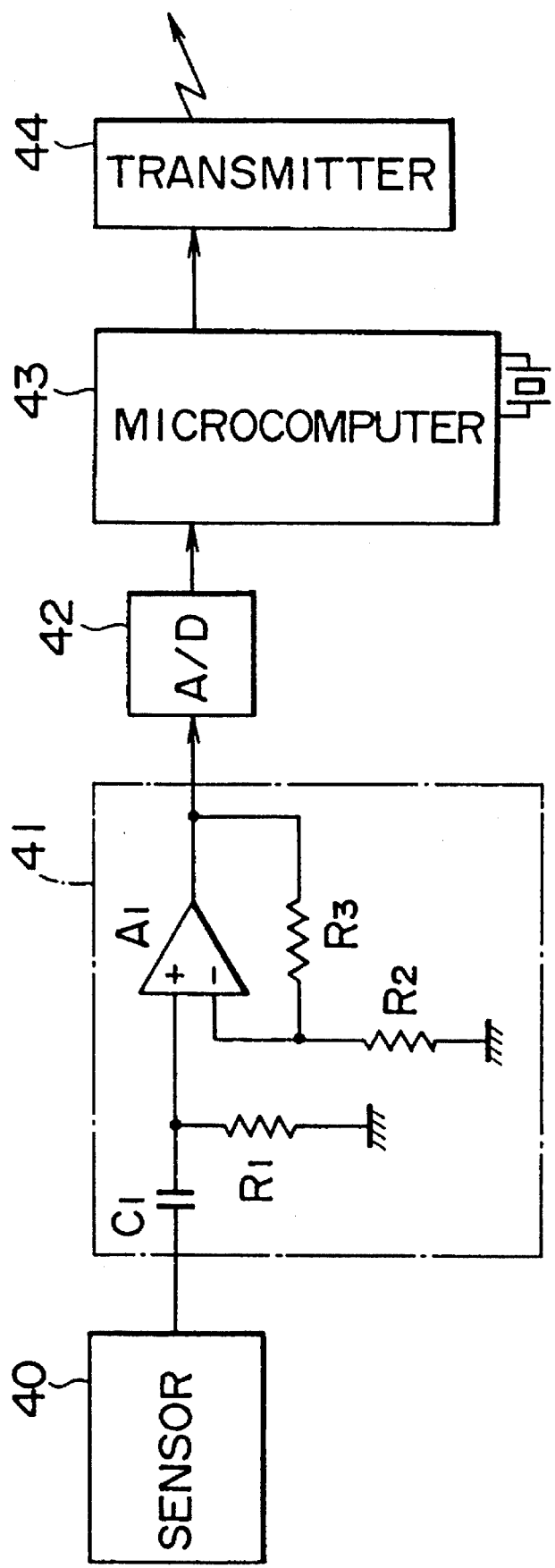
FIG. 17 is a block diagram illustrating the input apparatus.

To be specific, given an input apparatus provided with an angular velocity sensor or an acceleration sensor to output input information according to its movements in space, the output of the sensor has a temperature characteristic as shown in FIG. 16 when the input apparatus in a resting state. For this reason, an input apparatus using an angular velocity sensor is constituted as shown in FIG. 17.

That is, since an output of sensor 40 is at a minute level, the output is amplified by an amplifying portion 41 to be converted by an A-D converter 42 into digital data for transmission to a microcomputer 43. Based on the digital data, the microcomputer 43 generates data to be entered in predetermined equipment to sent it to a transmitter 44. The data generated by the microcomputer is modulated with a predetermined carrier frequency for example by the transmitter 44 to be transmitted to the predetermined equipment in the form of a radio signal or an infrared-ray signal.

In the amplifying portion 41, a resistor R2 is set to about 10 K ohms and a resistor R3 to about 800 K ohms to allow an amplifier A1 to be used with an amplification factor of about 31. Taking a drift in the output of the sensor 40 into consideration, a time constant circuit comprising a capacitor C1 and a resistor R1 is provided before the amplifier A1 to be AC coupled. When constituted this way, the input apparatus required for measuring a minute movement has to set a fairly large time constant produced by the capacitor C1 and the resistor R1. As a result, it takes long (about one to two minutes) for the operation of the input apparatus to be stabilized. Also, if a drastic temperature variation occurs, a large time constant will cause a drift in the output of the amplifier A1. To solve these problems, the power to the sensor must be always kept turned on or the input apparatus must be stored in a location where there is little exposure to temperature variation. However, such measures increase the power consumption of the sensor 40 to a relatively large extent, making the input apparatus not suitable for a battery-driven application.

If the capacitor C1 is removed to improve the stabilization time, a drift of about 1 V is generated in the output of the sensor 40 as shown in FIG. 16. If the output is amplified by the amplifier A1 having an amplification factor of about 31, the drift will result in about 30 V, making the input apparatus impractical when it performs a drive of about ±2.5 V with a battery or about ±15 V with a commercial power supply.

Figure 18:
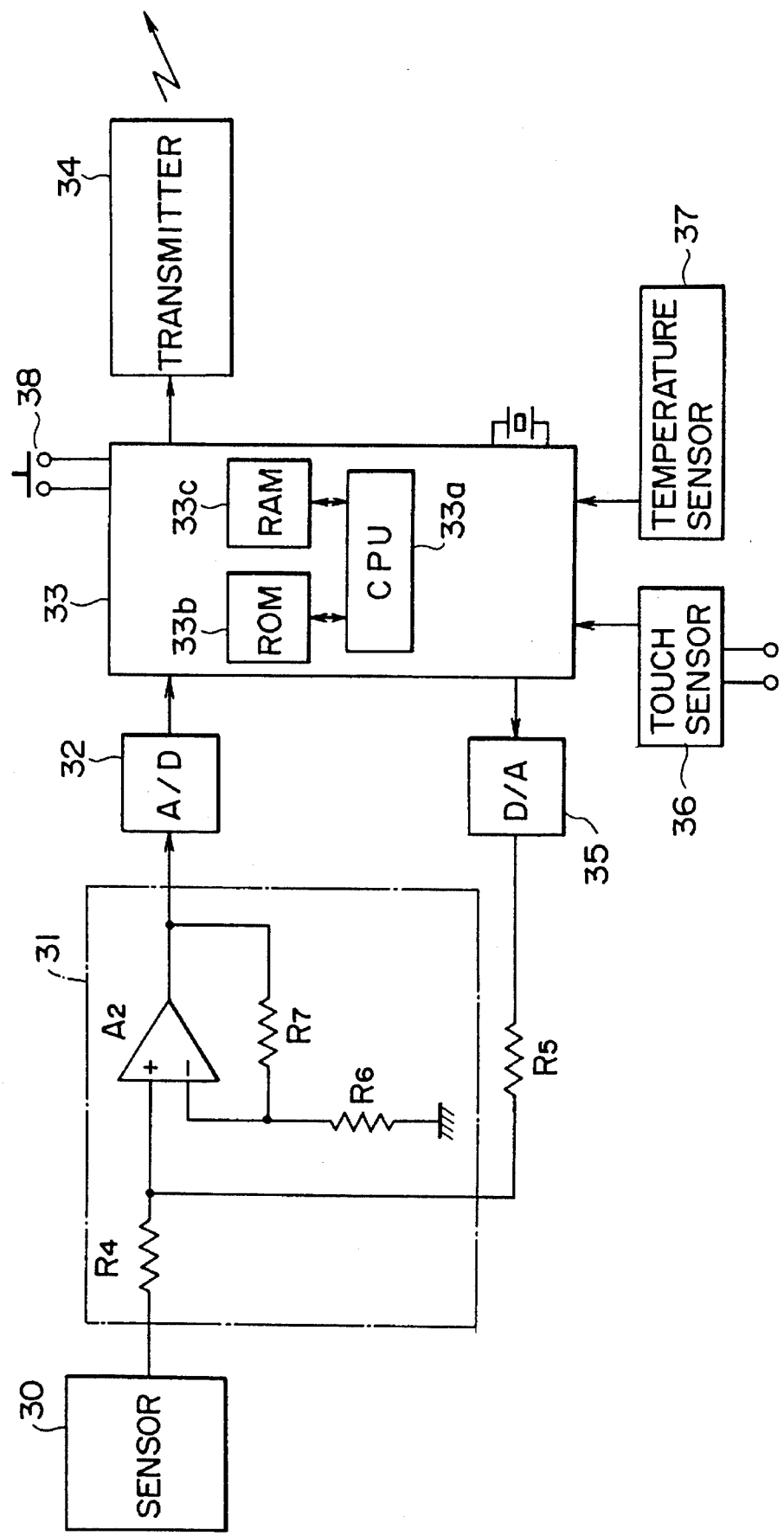
FIG. 18 is a diagram illustrating a basic constitution of another embodiment according to the invention.

To solve the above-mentioned problems, the input apparatus is constituted as shown in FIG. 18 for example. Referring to FIG. 18, a drift occurs in the output of the sensor 30 at itself, amplifying portion 31, and an A-D converter 32. At the same time, a touch sensor 36 for example is provided as motion stop detecting means. Based on information coming from the touch sensor 36, a microcomputer 33 comprising a CPU 33a, a ROM 33b, and a RAM 33c detects that the input apparatus is in a resting state, or it is not held by the operator.

When the input apparatus is in the resting state, a value representing a movement to be entered in the microcomputer 33 via the A-D converter 32 should be equal to a reference value (for example, 0 V). In this constitution, the microcomputer 33 applies a certain level of voltage to an input stage of an amplifier A2 via a D-A converter 35.

In the resting state, a movement detect value coming from the A-D converter 32 should be equal to the reference value (for example 0 V); actually, however, a drift may prevent the value from reaching the reference. To solve this problem, a correction voltage is output while gradually incrementing the movement detect value via the D-A converter 35 to be superimposed on the detection output. During this process, the value of the output from the A-D converter 32 reaches the reference value at a certain point. That is, the value which is output via the D-A converter 35 at the time the value output from the A-D converter 32 has reached the reference value becomes a drift correction value. The influence of the drift can be eliminated by this drift correction value.

Consequently, the sensor 30 and the amplifying portion 31 can be DC-coupled with a resistor R4 to require no time constant circuit, improving the stabilization time.

Meanwhile, since an amount of drift depends on temperature, temperature detecting means 37 may be provided to feed temperature information to the microcomputer 33 at certain intervals of time for example. The microcomputer 33 is provided with storage means 33c for storing the temperature information to compare newly fed temperature information with the stored temperature information, determining a temperature variation if any. This setup allows determining a suitable correction amount based on the detected temperature variation, again eliminating the influence of drift.

The detection output control means (that is, the microcomputer 33) is also adapted to supply a drive power to the movement detecting means (the sensor 30, the amplifying portion 31, and the A-D converter 32) when a temperature variation has been detected inside the input apparatus, that is, the correction value needs to be set. As a result, the detection output control means need not supply the drive power at other times, that is, when the input apparatus is in the resting state, reducing the power consumption.

Further, if the input apparatus is provided with operator means (38) for operating the output of code information (the Enter code) for establishing input information entered in predetermined equipment on the side thereof in correspondence with the detection output from the movement detecting means (30, 31, and 32), they need not operate during an Enter operation and therefore require no drive power, enhancing power saving.

FIG. 19 shows a constitution of the remote commander 10 having the oscillation gyroscopes 1x and 1y as shown in FIG. 7. An output voltage from the oscillation gyroscope 1x is amplified by an amplifying portion 3x to be digitized by an A-D converter 4x into a voltage value Ex. To be specific, the output of the oscillation gyroscope 1x is DC-coupled via a resistor R11 to be entered in an amplifier A11. The amplifier A11 is set with an amplification factor of about 31 by setting a resistor R12 to about 10 K ohms and a resistor R13 to about 300 K ohms for example.

Likewise, an output voltage from the oscillation gyroscope 1y is amplified by an amplifying portion 3y to be digitized by an A-D converter 4y into a voltage value Ey. To be specific, the output from the oscillation gyroscope 1y is DC-coupled via a resistor R15 to be entered in an amplifier A12. The amplifier A12 is set with an amplification factor of about 31 by setting a resistor R16 to about 10 K ohms and a resistor R17 to about 300 K ohms for example.

Reference numeral 5 indicates a controller comprising a microcomputer having a CPU 5a, a ROM 5b, and a RAM 5c. The ROM 5b or the RAM 5c stores command signals to be transmitted. Reference numeral 5d indicates a clock oscillator.

To the controller 5, the voltage value Ex is supplied from the A-D converter 4x and the voltage value Ey from the A-D converter 4y. The voltage values Ex and Ey are values equivalent to angular velocities obtained by swaying the input apparatus in x and y directions, respectively. That is, they provide movement information of x and y directions, respectively.

The controller 5 reads an x-direction Up command or an x-direction Down command from the ROM 5b or RAM 5c according to the entered voltage value Ex and reads a y-direction Up command or a y-direction Down command according to the entered voltage value Ey and sends the read commands to a transmitter 8 as command codes. The command codes generated by the controller 5 are modulated by the transmitter 8 in a predetermined manner to be transmitted to the predetermined target equipment in the form of an infrared-ray signal or a radio signal.

An interrupt timer 6 supplies an interrupt signal to the controller 5 at predetermined intervals of time.

Reference numerals 9x and 9y indicate D-A converters respectively for converting corrected voltage values Dx and Dy coming from the controller 5 into analog values. The analog voltage from the D-A converter 9x is applied to the amplifier A11 via a resistor R14, that is, superimposed on the output voltage from the oscillation gyroscope 1x. The analog voltage from the D-A converter 9y is superimposed on the output voltage from the oscillation gyroscope 1y via a resistor R18 to be applied to the amplifier A12.

Figures 20A, 20B:
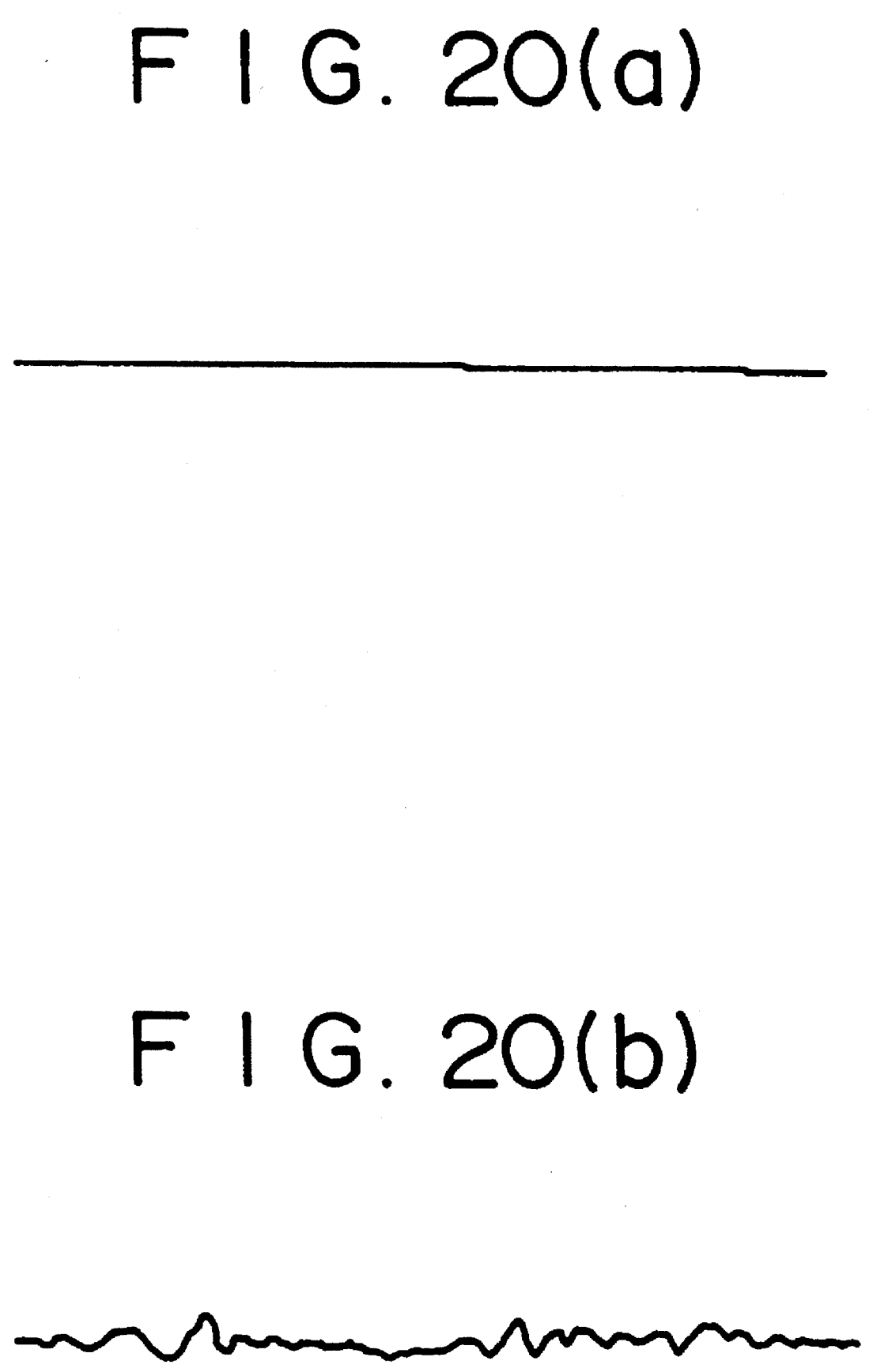

Reference numeral 11 is a touch sensor for detecting a state in which the remote commander 10 is held by the operator. A resultant detection signal is sent to the controller 5. The touch sensor 11 functions as means for turning on/off the operating power of the remote commander 10 and, at the same time, functions as means for detecting that the remote commander 10 is in a resting state. To be specific, the controller 5 turns on the operating power to the remote commander 10 when the touch sensor 11 has detected an operator's holding of the remote commander 10 to make it operate as the command code input apparatus for remote control as mentioned above. When the operator has let go of the remote commander 10, the controller 5 turns off the power to the commander. That is, the touch sensor 11 works as a power on/off switch. When the remote commander 10 is in the resting state, or it is not held by the operator and therefore no held state is detected by the touch sensor 11, the controller 5 determines the resting state, allowing the touch sensor 11 to work as a resting state detecting means. If the touch sensor 11 is not provided as the resting state detecting means, the controller 5 can be provided with a monitor capability for monitoring for the input voltage values Ex and Ey, making the capability serve as the resting state detecting means. That is, when the remote commander 10 is left untouched on a desktop, for example, in a complete resting state, the voltages values Ex and Ey do not change at all in terms of time as shown in FIG. 20(a); on the other hand, while the the remote commander 10 is held by the operator, the values fluctuate as shown in FIG. 20(b) due to an inevitable, unintentional vibration of the operator's hand even if the remote commander is not swayed. Monitoring the voltage values Ex and Ey for such a variation allows a determination of whether the remote commander 10 is in the resting state or not. It should be noted that the resting state detecting means is provided because setting a drift correction value to be described must be performed in the resting state.

Reference numeral 12 indicates a temperature sensor for detecting a temperature internal to the remote commander 10. An output (a voltage corresponding to the detected temperature) from the temperature sensor 2 is digitized by an A-D converter 13 to be fed to the controller 5 as temperature data.

V1 is a power line for feeding a supply voltage to the oscillation gyroscopes 1x and 1y, amplifying portions 3x and 3y, A-D converters 4x and 4y, and D-A converters 9x and 9y. V2 is a power line for feeding a supply voltage to the temperature sensor 12 and the A-D converter 13.

Figure 21A:
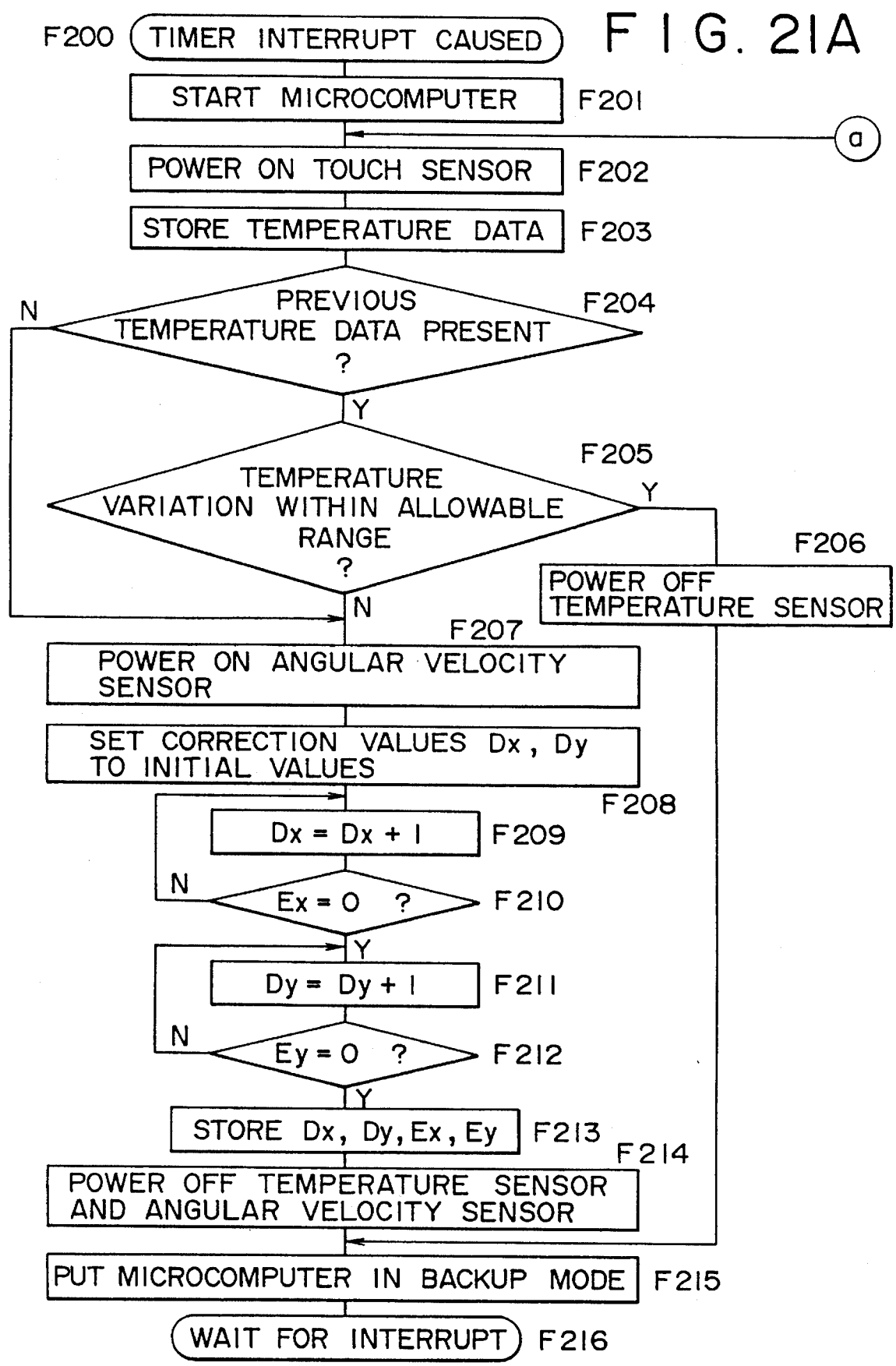
FIG. 21 comprising FIG. 21(a) and FIG. 21(b) is a flowchart of operations of the input apparatus of the embodiment of FIG. 18.
Figure 21B:
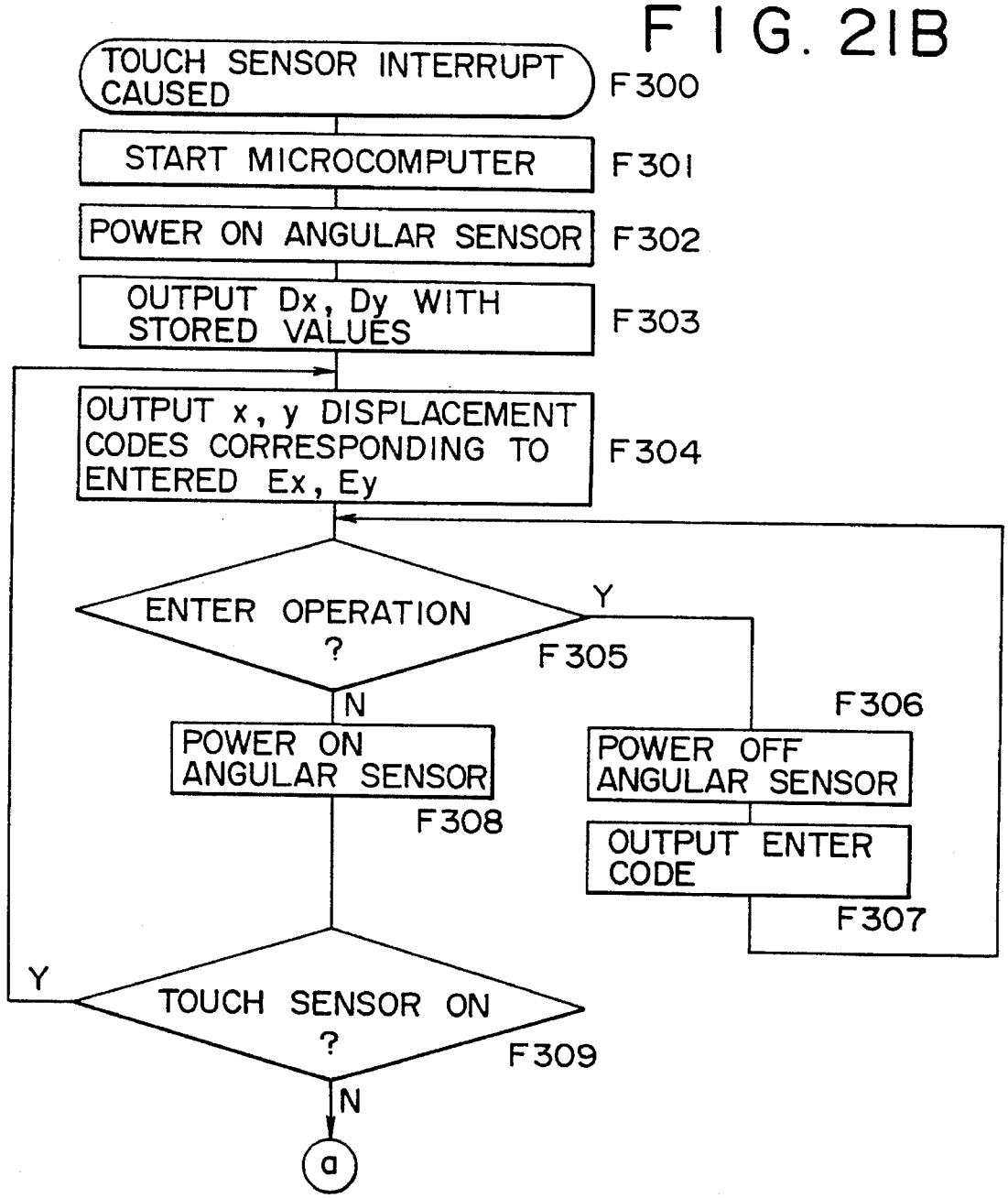
Figure 21:
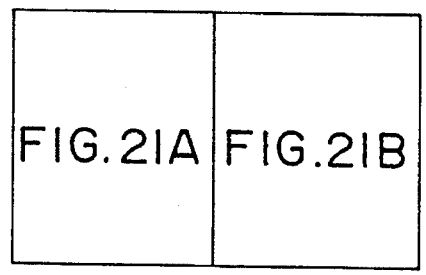

In what follows, the operation of the remote commander 10 practiced as a preferred embodiment of the present invention will be described with reference to a flowchart of FIG. 21. Processing shown in FIG. 21 is performed when an interrupt pulse is entered in the controller 5 by the interrupt timer 6 at an interval of 10 minutes for example (F200), FIG. 21A or when the touch sensor 11 has detected the holding of the remote commander 10 by the operator (F300), FIG. 21B.

When the operator is not using the remote commander 10, processing subsequent to F200 is performed based on the interrupt pulse supplied from the interrupt timer 6 at every 10 minutes. It will be apparent that, when the remote commander is used in an environment exposed to a drastic temperature variation, the interrupt pulse interval may be shortened to five minutes for example to reduce an effect of the temperature variation. Also, the interrupt timer 6 may be provided externally to the controller 5 or may be constituted by an internal timer of the controller 5.

Receiving the interrupt pulse, the controller 5 performs an activating operation (F201). It then turns on the power line V2 to turn on the temperature sensor 12 and the A-D converter 13 (F202).

Then, the controller 5 captures current temperature data from the temperature sensor 12 via the A-D converter 13 to store it in the RAM 5c (F203). It should be noted that, with this embodiment, the RAM 5c must store previously captured temperature data and therefore have storage areas arranged so that at least the previously captured data and the currently captured data are stored.

If the capture of temperature data is a first one (performed immediately after data backup was lost by battery replacement on the remote commander 10 or immediately after fabrication thereof) or data stored in the RAM 5c has been lost for some reason, the processing starts with step F204 and proceeds to F207.

On the other hand, if the previously captured temperature data is available, the processing proceeds to step F205 to compare it with the currently captured data to obtain a variation. If the temperature variation is found falling in an allowable range, the processing proceeds from step F205 to step F206, turning off the power line V2 to cut the power to the temperature sensor 12 and the A-D converter 13. The controller 5 enters a backup mode in which the data in the RAM 5c is held, turning off the operating power (this is called a standby state) (F215). The controller 5 waits for a next interrupt (F216).

If the previously captured temperature data is not available in step F204 or if a temperature variation exceeding the allowable range is found in step F205, the processing goes to correction value determination processing for correcting a drift in the angular velocity sensor.

First, the controller 5 turns on the power line V1 to apply the power voltage to the angular velocity sensor, that is, the oscillation gyroscopes 1x and 1y, the amplifying portions 3x and 3y, the A-D converters 4x and 4y, and the D-A converters 9x and 9y (F207). Then, the controller 5 sets correction values Dx and Dy to be output to the D-A converters 9x and 9y to initial values (F208).

Then, the controller 5 first supplies the correction value Dx to the D-A converter 9x by incrementing it from its initial setting to monitor for the voltage value Ex entered from the A-D converter 4x (F209, F210). If the output of the oscillation gyroscope 1x has no drift, the voltage value Ex to be detected should be 0 V; if the output has a drift, the voltage value does not get 0 V. However, when the voltage value is superimposed on the detection output by gradually varying the correction value Dx, the voltage value Ex gets 0 V at a certain point of time. That is, at this time, the correction value Dx becomes a correction value that realizes drift correction of the oscillation gyroscope 1x at a temperature at that point of time.

At the time when the voltage value Ex has reached 0 V, the controller 5 also determines a correction value for the output of the oscillation gyroscope 1y. That is, the controller 5 supplies the correction value Dy to the D-A converter 9y by incrementing it from its initial setting to monitor for the voltage value Ey entered from the A-D converter 4y (F211, F212). Then, the controller 5 uses the correction value Dy obtained when the voltage value Ey has reached 0 V as a correction value that realizes drift correction of the output of the oscillation gyroscope 1y at a temperature at voltage values having reached 0 V.

Upon determination of the correction values that realize drift correction, the controller 5 stores them in the RAM 5c (F213). It should be noted that, since the corrected and entered voltage values Ex and Ey involve a certain amount of offset, the controller 5 also stores it along with the corrected values.

Having stored the correction values Dx and Dy, the controller 5 turns off the power lines V1 and V2 to turn off the temperature sensor 12, A-D converter 13, the oscillation gyroscopes 1x and 1y, the amplifying portions 3x and 3y, A-D converters 4x and 4y, and the D-A converters 9x and 9y (F214). Then, the controller 5 enters the backup mode (F215) to wait for a next interrupt (F216).

Processing of steps F200 through F216 is thus performed at a predetermined time interval based on the interrupt timer 6, always holding in the RAM 5c the correction values with which drift correction can be made according to the temperature state.

When the operator takes hold of the remote commander 10 and the touch sensor detects it with the controller 5 waiting for a next interrupt in step F216, an interrupt signal from the touch sensor causes the processing subsequent to step F300 (FIG. 21A) to start.

Receiving the interrupt pulse from the touch sensor, the controller 5 first performs an activating operation (F301). Then, the controller 5 turns on the power line V1 to activate the angular velocity sensor (F302).

Then, the controller 5 reads the correction values Dx and Dy from the RAM 5c to send them to the D-A converters 9x and 9y (F304). Since these correction values were determined, by the processing from step F202 to step F215, suitable for a temperature state at least ten minutes before, the controller 5 superimposes the voltage resulting from these correction values over the output voltage of the oscillation gyroscopes 1x and 1y to supply a resultant voltage to the amplifiers A11 and A12, eliminating the drift caused by a temperature characteristic. At the same time, the voltage values Ex and Ey providing movement detection values to be entered in the controller 5 are cleared of the influence of the drift.

The controller 5 then outputs a command code which provides the position specifying information in x and y direction according to the entered voltage values Ex and Ey (F304).

When the Enter key 7 has been pressed, the processing proceeds from step F305 to step F360 to turn off the power line V1. This is because, during an Enter key operation, no angular velocity need to be detected. Then, the controller 5 reads the Enter command from the ROM 5b or the RAM 5c to send it to the transmitter 8 which transmits the Enter command to the predetermined target equipment (F307).

When the Enter operation has been cleared, the processing proceeds from step F305 to step F308. If the power line V1 has been turned off at the Enter operation, it is turned on again to supply the power to the angular velocity sensor for operation. The controller 5 continues the command code output operation according to this angular velocity detection or Enter operation until the touch sensor 11 detects the operator's letting go of the remote commander 10, realizing remote control over the predetermined target equipment (loop processing F304 through F309).

When the operator has let go of the remote commander 10, turning off the detection by the touch sensor 11, the processing proceeds from step F309 to step F202. If, as mentioned above, a variation is found between the current temperature and the stored temperature, the controller 5 determines correction values and store them as the new correction values Dx and Dy. If no variation is found, the controller 5 does not update the correction values Dx and Dy, turns off the power lines V1 and V2, and enters in the backup mode to wait for a next interrupt (F202 through F216).

With the present embodiment having the abovementioned constitution and operation, drift correction is performed by using the correction values to ensure the proper command output operation. Additionally, since no CR time constant circuit is provided for drift correction, the time for the above-mentioned operation to be stabilized is significantly shortened.

The temperature sensor is powered off by the power line V2 only when the interrupt timer has caused an interrupt or the operator has let go of the remote commander 10. The angular velocity sensor is powered on by the power line V1 only when the operator is operating the remote commander 10 or the controller 5 is determining the correction values Dx and Dy. Additionally, the angular velocity sensor is kept powered off during an Enter operation even when the operator is operating the remote commander 10.

Thus, the angular velocity sensor and the temperature sensor are supplied with the power only during a minimum necessary period, saving the power significantly. This power-saving constitution makes the remote commander suitable for being driven by a battery. It will be apparent that the power saving by frequently performing the power on/off operation on the angular velocity sensor as mentioned above functions effectively because of the realization of drift cancellation without using a time constant circuit to eliminate the otherwise instable initial operation.

It should be noted that, if the processing of FIG. 5 is employed, the correction values are not updated when the operator is operating the remote commander 10. Therefore, a temperature variation caused by using the remote commander 10 for long may not cancel a drift with the correction values effective at that time. To cope with such a situation, the controller is adapted to calculate averages of the voltage values Ex and Ey to be entered into it into a certain period of time and use the averages to forecast a voltage value (an amount of drift) in the resting state. The controller is further adapted to further adjust the correction values Dx and Dy accordingly, making the remote commander suitable for a long hour use.

Alternatively, the temperature sensor may be turned on at a certain time interval even during use to adjust the correction values Dy and Dy accordingly.

It will be apparent that, as a variation to the above-mentioned embodiment, the drift correction values Dx and Dy at certain temperatures and the corrected voltage values Ex and Ey may be stored in the RAM 5c in the form of a data table in correspondence with temperature data. For example, temperatures from 0 degree centigrade to 40 degrees centigrade are expressed in an 8-bit binary notation as follows: 0 degree centigrade="00000000", 0.156 degree centigrade="00000001", and 40 degrees centigrade="11111111", thus dividing the temperatures between 0 to 40 degrees centigrade into 256 in an increment of 0.156 degree centigrade. For each of the 256 pieces of the temperature data, the correction values Dx and Dy and the corresponding voltage values Ex and Ey are stored in the form of a-table so that they correspond to the temperature data in the processing of the abovementioned steps F208 through F213. If this operation is performed, using the remote commander for several days can store most of the data on the correction values in necessary temperature states. For a temperature for which the corresponding correction values Dx and Dy have once determined, no subsequent correction value determination need be executed, further enhancing power saving. When the operator uses the remote commander, the controller detects temperature data at that time and reads the corresponding correction values to put them out.

It should be understood that, although the foregoing relates to only the embodiments using the oscillation gyroscopes, only one unit of an oscillation gyroscope may be used when the input apparatus is intended to detect only vertical or horizontal movement information; if the input apparatus is required to detect three-dimensional movement information, three units of oscillation gyroscopes are installed.

It will be apparent that, in addition to the above-mentioned angular velocity sensor, an acceleration sensor or a pressure sensor may be used for detecting a movement of the input apparatus in space or a movement applied thereto.

It will be also apparent that, although the above-mentioned embodiments transmit the command signals to the target equipment in a wireless manner, the embodiments may be wired to the equipment for transmission.

It will be apparent that the input apparatus according to the present invention is available as a remote commander for electronic equipment such as AV equipment and air conditioning equipment, an input apparatus equivalent to a mouse for personal computers, and an operator control for game playing equipment.

It will be further apparent that the sensor output drift cancel technique according to the present invention may be widely applied to attitude control mechanisms for use on a car navigation system, crane trucks, machine tools, and the like.

While the preferred embodiments of the invention have been described using specific terms, such description is for illustrative purpose only, and it is to be understood that changes and variations may be made without departing from the spirit or scope of the appended claims.

What is claimed is:

1. A input apparatus comprising:

motion detecting means for detecting a momentum of either a given traveling motion in space in a main body of said input apparatus or a motion applied to said main body and generating a detected output having a predetermined temperature characteristic;

transmitting means for transmitting information corresponding to the detected output from said motion detecting means to predetermined equipment as input information in either a wired or wireless manner;

temperature detecting means for detecting a temperature in said main body at a predetermined interval of time to output the detected temperature as temperature information;

storage means for storing the temperature information obtained by said temperature detecting means; and detected output control means for comparing the temperature information obtained by said temperature detecting means with temperature information stored in said storage means to detect a temperature variation in said main body and, if a temperature variation exceeding a predetermined level is found, correct the detected output of said motion detecting means and store an amount of the correction in said storage means in correspondence with the temperature information obtained by said temperature detecting means.

2. An input apparatus as defined in claim 1, wherein said detected output control means supplies a drive voltage to said motion detecting means when a temperature variation in said main body exceeding the predetermined level has been found with said input apparatus being in a standby state.

3. An input apparatus as defined in claim 1, further comprising operating means for outputting output of code information to establish, on a side of the predetermined equipment, the input information entered in the predetermined equipment in correspondence with the detected output of said motion detecting means, wherein said detected output control means stops supplying a drive power to said motion detecting means at least while said code information is outputted by operating said operating means.

4. An input apparatus as defined in claim 1 or 2, wherein said detecting means are provided in plurality and said information generating means generates, based on a detection result outputted from each of said detecting means, position specifying information at multidimensional coordinates corresponding to a given movement in space.

5. An input apparatus as defined in claim 1 or 2, wherein said detecting means are held in said input apparatus in a floating state to be always held in a constant direction relative to gravity direction.

* * * * *